US005656871A

United States Patent [19]
Lee

[11] Patent Number: 5,656,871
[45] Date of Patent: Aug. 12, 1997

[54] CIRCUIT ARRANGEMENT FOR AN UNINTERRUPTED POWER SUPPLY

[75] Inventor: Daniel Lee, Hsin Tien, Taiwan

[73] Assignee: Sysgration, Ltd., Taipei Hsien, Taiwan

[21] Appl. No.: 520,419

[22] Filed: Aug. 29, 1995

[51] Int. Cl.$^6$ .................................................. H02J 7/00
[52] U.S. Cl. .............................. 307/66; 307/64; 323/299; 323/300; 323/301
[58] Field of Search ........................ 307/64, 66; 323/299, 323/300, 301

*Primary Examiner*—William M. Shoop, Jr.
*Assistant Examiner*—Kim Lockett
*Attorney, Agent, or Firm*—Bacon & Thomas

[57] ABSTRACT

An uninterrupted power supply with improved circuit arrangement includes a controller, a detecting circuit and a control circuit. When the incoming AC voltage is normal and in a positive half-wave cycle, an input pin of the controller detects the actual voltage level of the secondary voltage of a transformer. When the incoming AC voltage is in a negative half-wave cycle, the input pin of the controller receives a sinusoidal input waveform voltage based on the voltage Vcc which acts as a reference voltage, and the controller processes the sinusoidal input waveform voltage by subtracting the secondary voltage of the transformer from the voltage reference Vcc to obtain a sinusoidal half-wave voltage with positive half-wave cycle. The controller combines the positive and negative half-wave cycle signals to obtain a composite voltage, and then calculates the RMS value of the composite voltage so as to determine the changing situation of the incoming AC voltage. The controller further actuates a series of transistors to energize an autotransformer to supply a stable regulated voltage.

6 Claims, 6 Drawing Sheets

CIRCUIT ARRANGEMENT FOR AN UNINTERRUPTED POWER SUPPLY

BACKGROUND OF THE INVENTION

1. Field of the Invention

This invention relates to a circuit arrangement for an uninterrupted power supply, and more particularly to an intelligent detection and control device capable of detecting incoming AC power and supplying a more stable regulated power when the incoming AC power fails or is abnormal.

2. Description of the Prior Art

The domestic electrical power system is AC110V in Taiwan. Another rated voltage is possible in other foreign electrical power system. It is a common problem that the line voltage of the electrical power system is changed by the electrical load effect. For example, it has been found that the incoming voltage from the power company in the daytime is always lower than that in the nighttime. The major reason is that a heavier power consumption is required in the daytime. In addition, a load disturbance problem may be present on the power transmission line. In such poor conditions, it is difficult to supply stable power to electrical devices, particularly to an electrical appliance requiring a pure and stable power source.

The conventional uninterrupted power supply (abbreviated UPS) is widely used in electrical devices, such as computer or test instruments, but it is merely a simple backup power source which switches from the power supplied by the power company to a backup battery set when the power fails. Furthermore, the present invention has been filed in Taiwan under the application Serial number of 83202739, the other corresponding applications are 94205201.3 (China), 08/327.935 U.S.A.), DE(G 9407011.3).

SUMMARY OF THE INVENTION

In view of the drawbacks of the conventional uninterrupted power supply mentioned above, the present invention provides an improved electrical control circuit for an uninterrupted power supply.

Consequently, the primary object of the present invention is to provide a power supplying control circuit for supplying power to an electrical load upon detecting that the incoming AC power source is in a failure condition.

The present invention is capable of detecting the incoming AC power and supplying a stable voltage output. Furthermore, the present invention is provided with an autotransformer controlled by a microcomputer based controller for monitoring the incoming power source and supplying regulated power according to the voltage level of the incoming power source.

The other objects and features of this invention will become more fully apparent and readily understood from the following description together with the accompanying drawings.

DESCRIPTION OF THE PREFERRED EMBODIMENT

Figure 1:
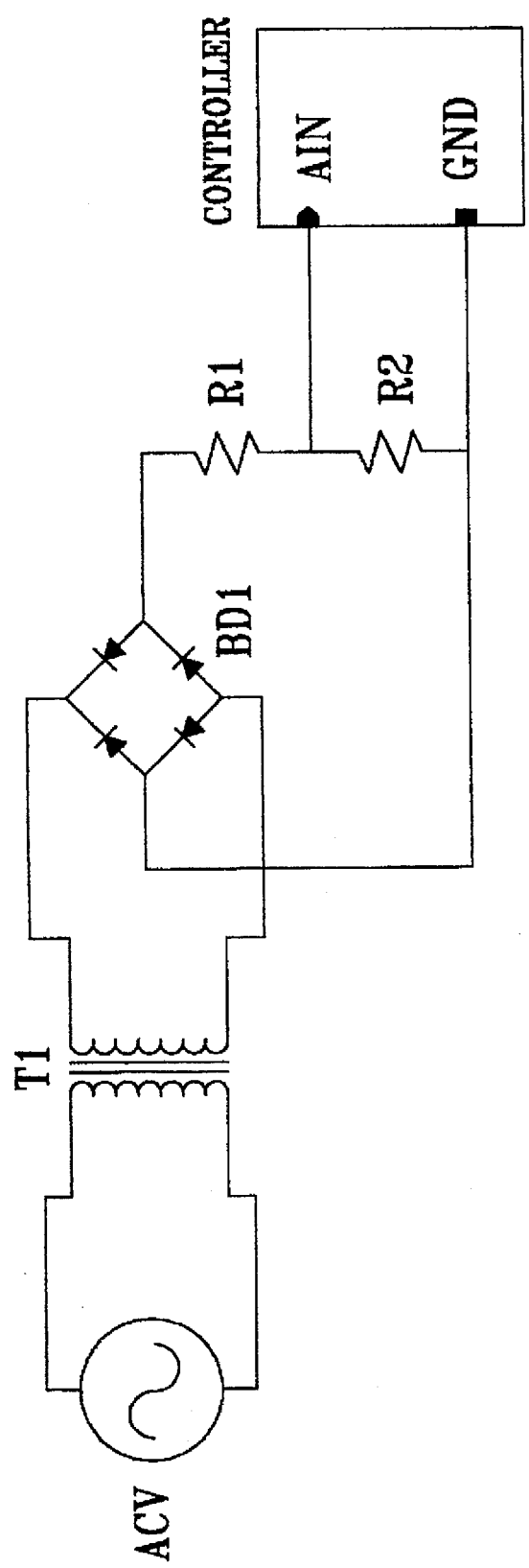
FIG. 1 is a prior art detecting circuit diagram for detecting the incoming power supplying situation.
Figure 1A:
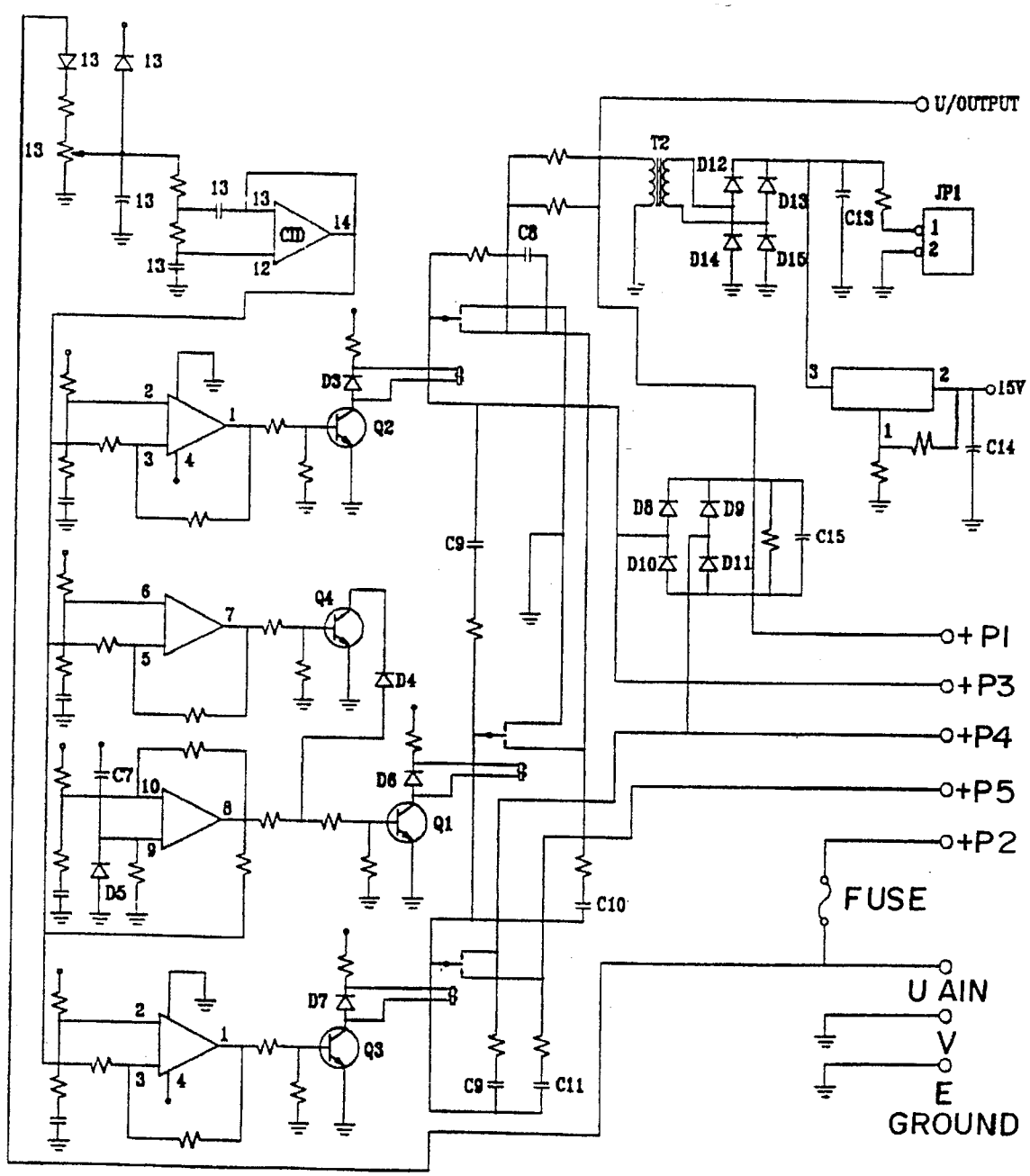
FIG. 1A is a detailed control circuit diagram of the prior art controller shown in FIG. 1.

The present invention is described in detail, with reference to the accompanying drawings, as follows:

Referring now to FIG. 1, which shown a prior art voltage detecting circuit for detecting the supplying situation of an incoming alternative voltage power source ACV. FIG. 1A shows a typical control circuit of the controller shown in FIG. 1. The prior art voltage detecting circuit is provided with a full-wave bridge type rectifier BD1 for rectifying the secondary voltage of a transformer T1 to a DC voltage. The rectified DC voltage of the rectifier BD1 is further divided by a voltage divider consisting of two resistor R1 and R2 into a lower DC voltage. The lower DC voltage is further supplied to an input pin AIN of a prior art controller. A typical circuit arrangement of the prior art controller is shown in FIG. 1A.

In the prior art, it is impossible to detect the positive or negative half cycle of the AC voltage, so it is necessary to use a well-known phase control circuit for synchronizing the AC voltage, as shown in FIG. 1A. Furthermore, the prior art controller must contain a number of comparators to detect the level of the incoming AC voltage, with the result that the cost is high and the complex circuitry is difficult to be maintained.

The prior art control circuit takes the detected peak voltage value of the AC voltage as a comparative voltage reference. However, when the incoming AC voltage is disturbed during transmission, the control circuit will fail to correctly detect the abnormal situation. It is obvious that both the prior art detecting circuit and control circuit are not a good design.

Figure 2:
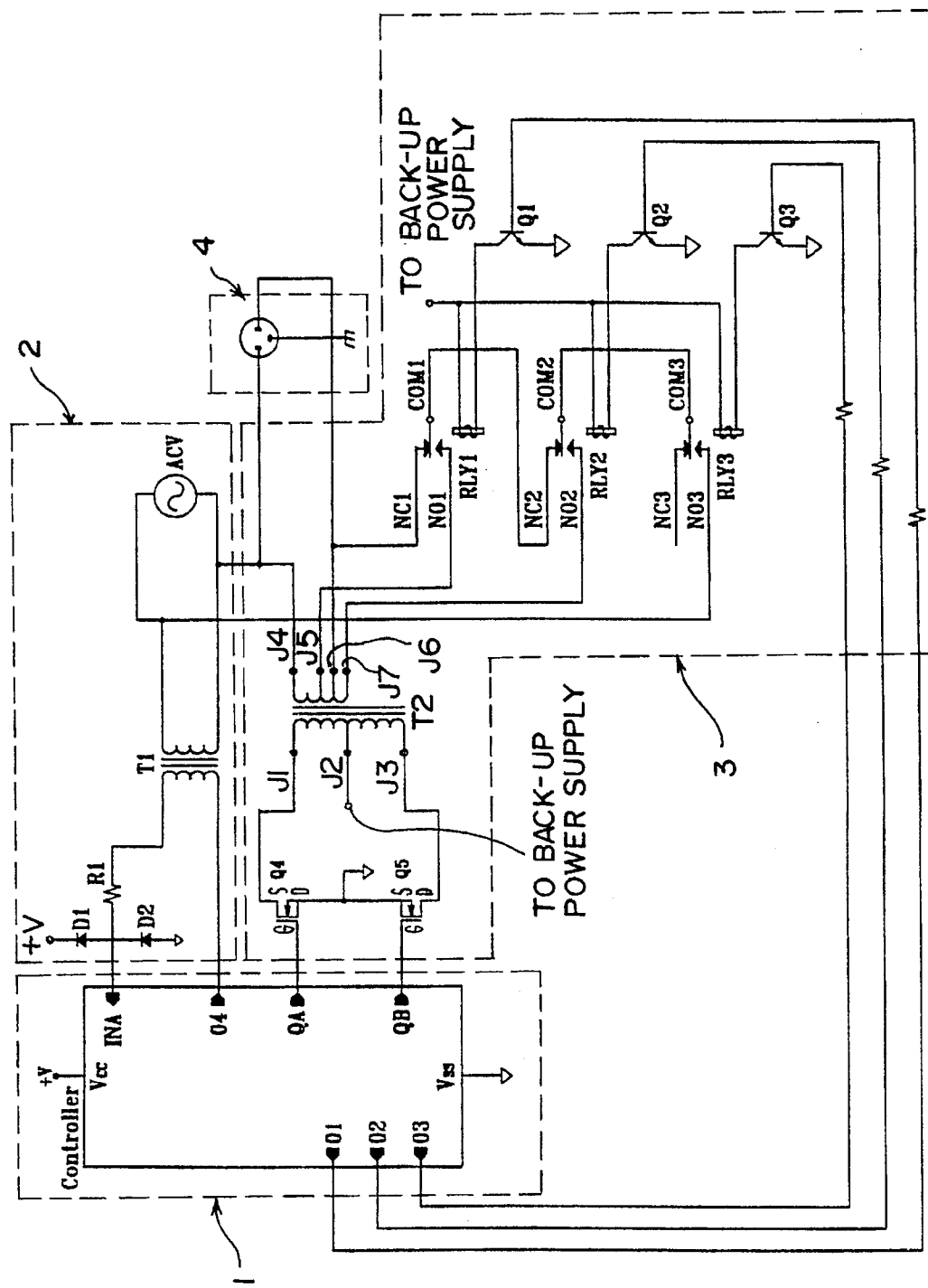
FIG. 2 is a detection and control circuit diagram according to a preferred embodiment of the present invention.

FIG. 2 is a circuit diagram of the preferred embodiment of the present invention. The incoming alternative voltage ACV is transferred to a lower voltage acceptable to the controller 1 via a transformer T1. The output voltage of the transformer T1 is connected to an input pin INA and an output pin O4 of the controller 1. A resistor R1 may be connected in series between the secondary coil of the transformer T1 and the input pin INA of the controller 1.

The controller 1 may be a general purpose microprocessor for controlling the operation of the uninterrupted power supply of the present invention. During the normal supplying condition of the incoming AC voltage ACV, the controller 1 may monitor the supplying situation of the AC voltage. Furthermore, the controller 1 may control of a regulator circuit 3 to supply a more stable regulated output AC voltage to an electrical socket 4 according to the voltage level of the incoming AC voltage ACV.

Figure 3:
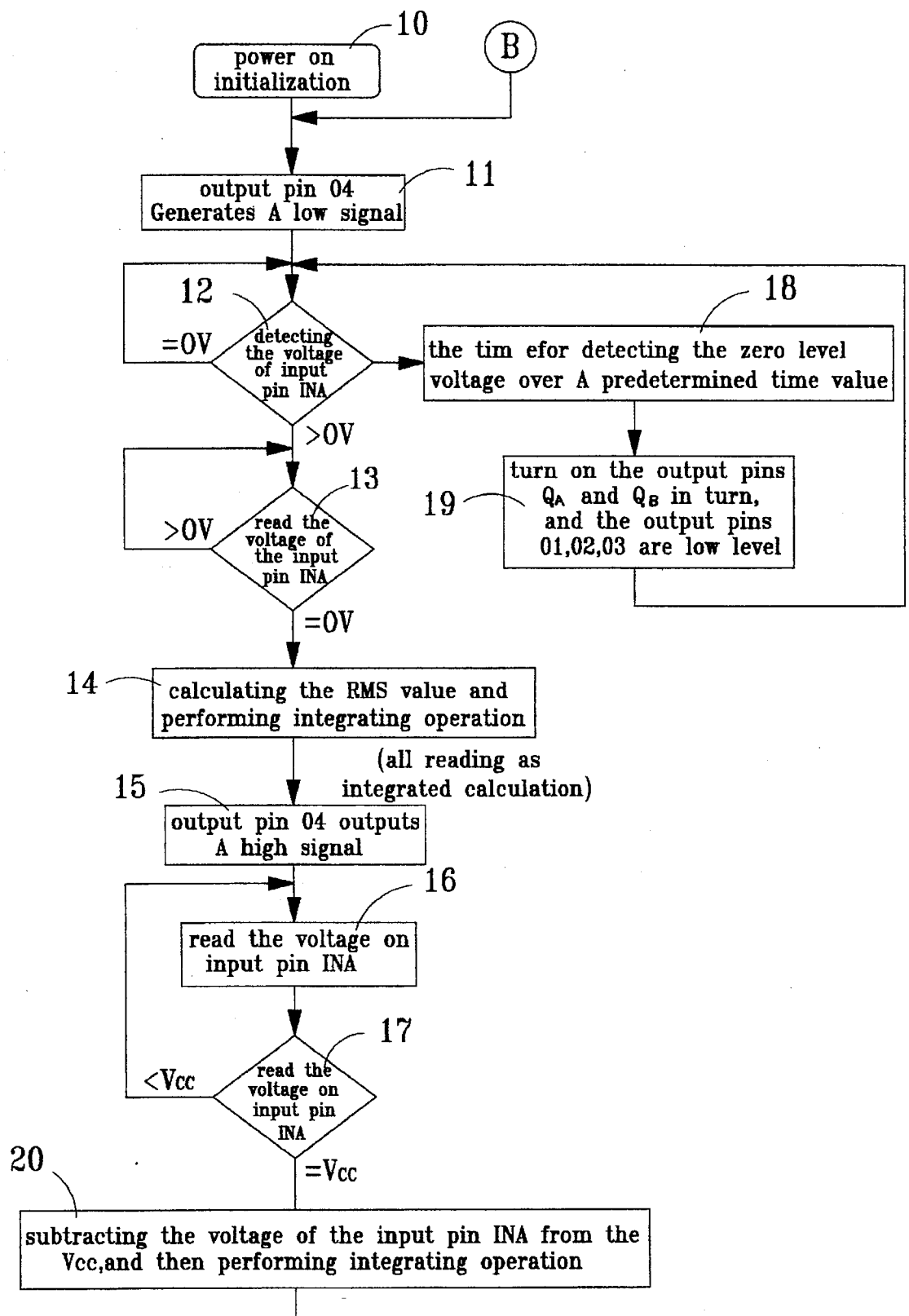
FIG. 3 is a flow chart of the detecting circuit of the present invention.

FIG. 3 is an operating flow chart of the present invention. After a normal power on initialization step 10, the controller first generates a low level signal at its output pin O4, and then the input pin INA of the controller 1 receives the secondary voltage of the transformer T1 in step 12. When the incoming AC voltage ACV is in a normal power supplying situation and in a negative half-wave power cycle, the secondary voltage ACV of the transformer T1 is also in negative half-wave power cycle (referring to FIG. 5), and therefore the input pin INA of the controller 1 is limited to a voltage level of Vss-0.7 by the resistor R1 and the diode D2. The controller 1 treats the voltage level as zero voltage.

Figure 5:
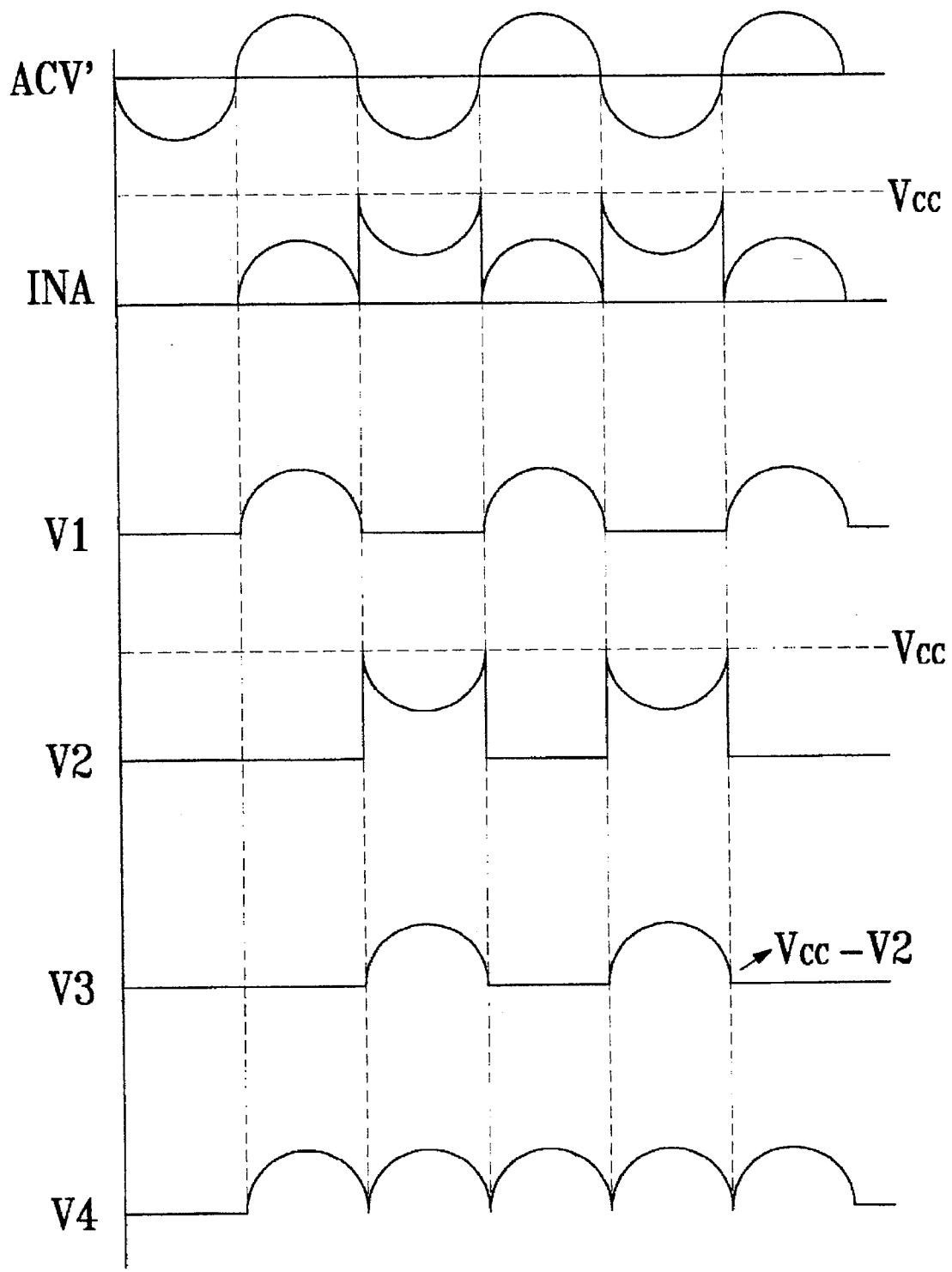
FIG. 5 is a waveform diagram of the present invention.

In next step 13, when the incoming AC voltage ACV is in a sinusoidal positive half-wave power cycle, the input pin INA of the controller 1 will receive the actual secondary voltage of the transformer T1 until the voltage drops to zero voltage. The waveform of the actual secondary voltage is shown in FIG. 5, indicated by V1. The controller 1 is capable of calculating the root-means-square (abbreviated RMS) value of the positive half-wave cycle of the actual secondary voltage in step 14, and then performing an integrated calculation.

In step 15, the controller 1 generates a high level signal which may be equal to Vcc at output pin O4, and continually receives the secondary voltage of the transformer T1 in step 16. At this time, the incoming AC voltage ACV is in a negative half-wave cycle, and the input pin INA of the controller 1 will receive a sinusoidal input waveform voltage based on the voltage Vcc which acts as a reference voltage in step 17, as shown in FIG. 5, indicated by V2. In step 20, the controller 1 processes the sinusoidal input waveform by subtracting the secondary voltage of the transformer T1 from the voltage reference Vcc to obtain a simulated sinusoidal half-wave voltage with a positive half-wave cycle, indicated by V3.

Thereafter, the controller composites the positive and negative half-wave cycle signals V1 and V3, and obtains a composite voltage V4. The composite voltage is actually the same as the full-wave voltage obtained by a known full-wave rectifier, so that the present invention may correctly determine the changing situation of the incoming AC voltage without the need for a conventional full-wave bridge rectifying circuit as shown in FIG. 1.

In case the incoming AC voltage fails or is in an abnormal condition, in step 18 the input pin INA of the controller 1 does not receive a zero level voltage for a predetermined time period. The controller 1 will turn on the transistors Q4 and Q5 in turn via its output pins QA and QB respectively. A backup power source may supply a current from backup power source terminal +V, referring to FIG. 2, to the second terminal J2 and the first terminal J1 of the autotransformer T2, the transistor Q4, and finally to ground GND, or from the backup power source terminal to the second terminal J2 and the third terminal J3 of the autotransformer T2, and finally to the transistor Q5. Then, the autotransformer T2 may generate an output voltage to the electrical socket 4 via the forth terminal J4 and the sixth terminal J6 thereof. The output voltage of the autotransformer serves as an uninterrupted AC voltage for replacing the incoming AC voltage. In such a condition, in step 19, the output pins O1, O2, and O3 of the controller 1 are set to a logical low level, so that the transistors Q1, Q2, and Q3 are not conductive. The relays RLY1, RLY2, and RLY3 are not energized, meaning that the current path of the AC voltage ACV is isolated.

Figure 4:
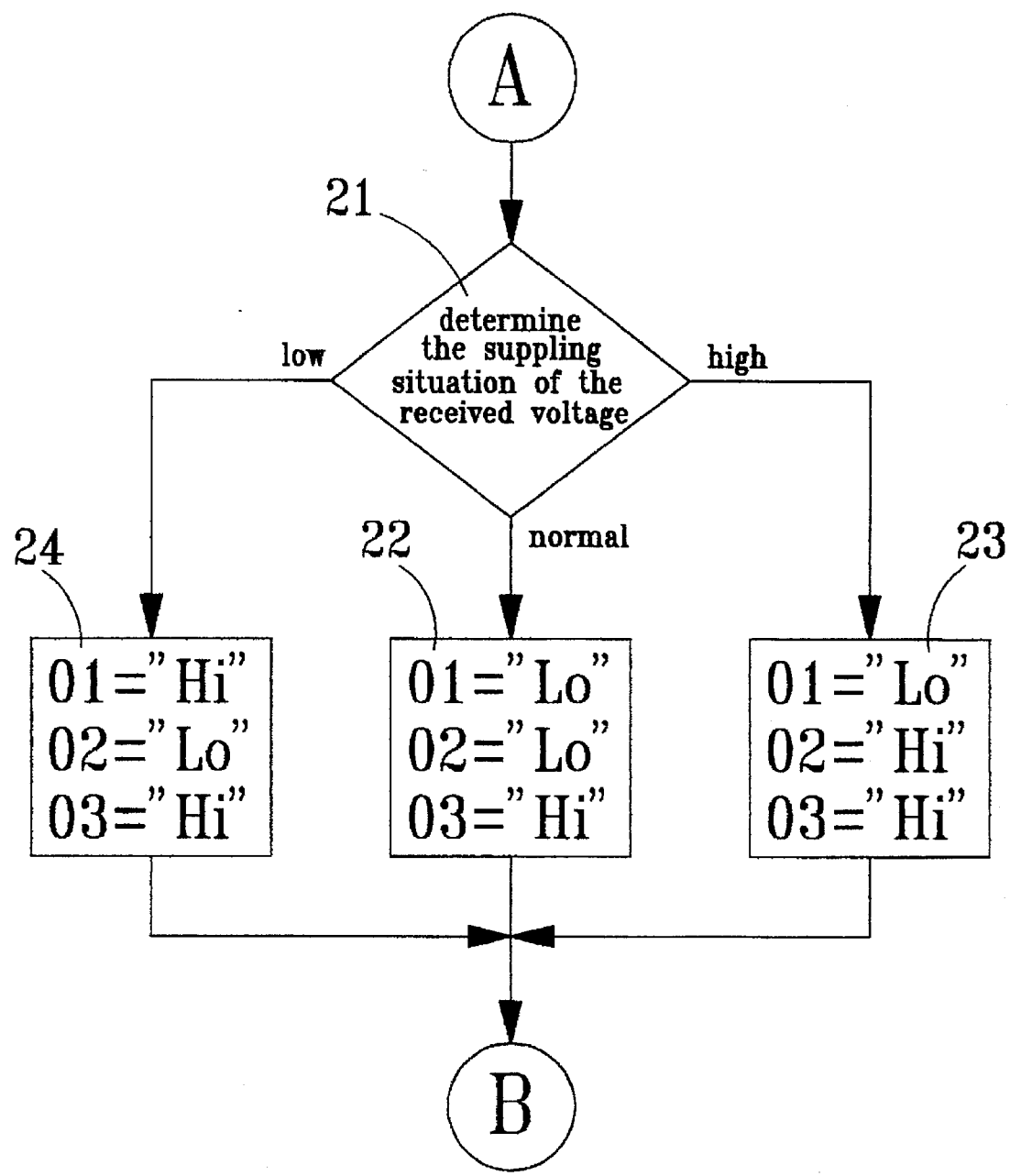
FIG. 4 is a flow chart of the voltage regulating circuit of the present invention.

Referring to FIG. 4, in step 21, when the controller 1 receives the RMS value of the positive half-wave cycle, it will perform an integrating operation for the RMS value to determine the situation of the received voltage. When the incoming AC voltage ACV is normal, a step 22 will be executed. In this step, the output pin O1 is at a low level, the output pin O2 is at a low level, and the output pin Q3 is at a high level, so that only the transistor Q3 is conductive and the relay RLY3 is energized. The incoming AC voltage ACV may reach the common contact COM2 of the second relay RLY2 via the normally open contact NO3 and the common contact COM3 of the relay RLY3. The incoming AC voltage ACV may be further supplied to the electrical socket 4 via the common contacts COM2 and the normally closed contact NC2 of the second relay RLY2, the common contacts COM1, and the normally closed contact NC1 in sequence.

In step 23, in case the incoming AC voltage ACV is higher than a predetermined normal voltage level, the output pin O1 of the controller I outputs a low level signal, while the output pins O2 and O3 output a high level signal. As result, both of the transistors Q2 and Q3 are conductive so as to energize the second relay RLY2 and the third relay RLY3. As a result of this condition, the incoming AC voltage ACV may reach to the seventh terminal J7 of the autotransformer T2 via the normally open contact NO3 and the common contact COM3 of the third relay RLY3, the common contact COM2 and the normally open contact NO2 of the second relay RLY2 in sequence. Because the sixth terminal J6 of the autotransformer T2 is an intermediate winding selected between the forth terminal J4 and the seventh terminal J7, the sixth terminal J6 will supply a lower voltage in comparison with the incoming AC voltage ACV, to the electrical outlet 4.

In step 24, in case the incoming AC voltage ACV is lower than a predetermined normal voltage level, the output pin O2 of the controller 1 outputs a low level signal, while the output pins O1 and O3 output a high level signal. As result, both the transistors Q1 and Q3 are conductive so as to energize the first relay RLY1 and the third relay RLY3. Under this condition, the incoming AC voltage ACV may reach to the fifth terminal J5 of the autotransformer T2 via the normally open contact NO3 and the common contact COM3 of the third relay RLY3, the common contact COM2 and the normally open contact NO2 of the second relay RLY2, the common contact COM1 and the normally open contact NO1 of the first relay RLY1 in sequence. Because the fifth terminal J5 of the autotransformer T2 is an intermediate winding between the forth terminal J4 and the sixth terminal J6, so that the sixth terminal J6 of the autotransformer T2 will supply a higher voltage, compared with the incoming AC voltage ACV, to the electrical outlet 2. As result, it is possible to supply a more stable regulated voltage than the incoming AC voltage.

In conclusion, the improved circuit arrangement of the uninterrupted power supply in accordance with the present invention is an improved and intelligent detection and control circuit with simple circuitry, capable of detecting the changing situation of the incoming AC voltage source for supplying a more stable regulated AC voltage.

Many changes and modifications in the above described embodiment of the invention can be carried out without departing from the scope thereof. Accordingly, to promote the progress in science and the useful arts, the invention is disclosed and is intended to be limited only by the scope of the appended claims.

What is claimed is:

1. A circuit arrangement comprising:
 means for monitoring AC power supplied by an AC power source to a socket, said monitoring means including a controller and a transformer having a secondary winding connected to a pair of inputs of the controller, wherein said monitoring means includes:
  means for detecting a positive half-wave voltage level of the transformer secondary during a positive half-wave cycle of the AC power and for subtracting a voltage level of the secondary from a reference during a negative half-wave cycle of the AC power to obtain a second positive half-wave voltage;
  means for combining the first positive half-wave voltage with the second positive half-wave voltage to obtain a composite full-wave rectified voltage; and
  means for calculating a root-mean-square RMS value of the composite voltage; and
 voltage regulator means for regulating a voltage of the AC power supplied to said socket based on said RMS value.

2. An arrangement as claimed in claim 1, wherein said voltage regulator means includes relays connected between the AC power source and terminals of an autotransformer secondary winding, said terminals of the autotransformer secondary winding in turn being connected to said socket, and means connected to outputs of the controller for controlling said relays to connect different terminals of the autotransformer secondary winding to said socket to vary a voltage of said AC power supplied to said socket.

3. An arrangement as claimed in claim 2, wherein a number of said relays is three, and said means for controlling said relays includes one transistor for each relay, a control electrode of each transistor being connected to a corresponding output of said controller, different ones of said transistors being activated depending on whether the power supply voltage monitored by said monitoring means, as represented by said RMS value, is at a predetermined normal level, higher than said normal value, or lower than said normal value.

4. An arrangement as claimed in claim 3, wherein said controller further includes means for activating a backup power source when said RMS value indicates an abnormal or failed power supply, and supplying said backup power to said socket through said autotransformer while said relays are controlled to isolate said socket from said AC power supply.

5. An arrangement as claimed in claim 1, wherein said controller further includes means for activating a backup power source when said RMS value indicates an abnormal or failed power supply, and supplying said backup power to said socket through an autotransformer while isolating said socket from said AC power supply.

6. An arrangement as claimed in claim 1, wherein said monitoring means includes a resistor connected between said transformer secondary and one of the pair of controller inputs, a diode connected between said resistor and a constant voltage source, and a diode connected between said resistor and ground, said resistor and diodes permitting said first half-wave voltage to be passed to said one of said pair of controller inputs.

* * * * *